US008882203B2

(12) United States Patent
Takehara et al.

(10) Patent No.: US 8,882,203 B2
(45) Date of Patent: Nov. 11, 2014

(54) LOCKING CONNECTION MEMBER OF COVERING MATERIAL AND METHOD OF MANUFACTURING COVERED CUSHION FORMED BODY

(75) Inventors: Keiji Takehara, Hyogo (JP); Satoru Ono, Sakai (JP); Eiichirou Doi, Aichi (JP); Takeshi Yamashita, Aichi (JP)

(73) Assignees: Kuraray Fastening Co., Ltd., Osaka-shi (JP); Morito Co., Ltd., Osaka-shi (JP)

( * ) Notice: Subject to any disclaimer, the term of this patent is extended or adjusted under 35 U.S.C. 154(b) by 329 days.

(21) Appl. No.: 13/259,194

(22) PCT Filed: Mar. 8, 2010

(86) PCT No.: PCT/JP2010/053816
§ 371 (c)(1),
(2), (4) Date: Jan. 31, 2012

(87) PCT Pub. No.: WO2010/110042
PCT Pub. Date: Sep. 30, 2010

(65) Prior Publication Data
US 2012/0133194 A1 May 31, 2012

(30) Foreign Application Priority Data
Mar. 27, 2009 (JP) ................. 2009-080323

(51) Int. Cl.
A47C 31/02 (2006.01)
B68G 7/12 (2006.01)

(52) U.S. Cl.
CPC ............ B68G 7/12 (2013.01); A47C 31/023 (2013.01)
USPC .................. 297/452.6; 297/218.2

(58) Field of Classification Search
USPC .......................... 297/452.6, 218.2
See application file for complete search history.

(56) References Cited

U.S. PATENT DOCUMENTS

| 3,403,429 A | 10/1968 | Smith |
| 4,776,636 A * | 10/1988 | Pyle et al. ............. 297/452.6 X |
| 6,206,467 B1 * | 3/2001 | Mense et al. ............. 297/218.2 |
| 6,443,525 B1 * | 9/2002 | Haupt .................. 297/452.6 X |
| 7,077,473 B2 * | 7/2006 | Demain et al. ........... 297/218.2 |
| 2005/0039312 A1 | 2/2005 | Tanokura et al. |
| 2010/0181817 A1 | 7/2010 | Tanaka et al. |

FOREIGN PATENT DOCUMENTS

| JP | 61 86100 | 6/1986 |
| JP | 2 88599 | 7/1990 |
| JP | 07-059606 A | 3/1995 |
| JP | 2005-000418 A | 1/2005 |
| JP | 2006 141619 | 6/2006 |
| JP | 4156449 | 9/2008 |

OTHER PUBLICATIONS

International Search Report Issued Apr. 13, 2010 in PCT/JP10/053816 filed Mar. 8, 2010.
Japanese Office Action issued May 7, 2014 in patent application No. JP2011-505952.
Office Action issued Aug. 20, 2013 in Japanese Patent Application No. 2011-505952.

* cited by examiner

*Primary Examiner* — Anthony D Barfield
(74) *Attorney, Agent, or Firm* — Oblon, Spivak, McClelland, Maier & Neustadt, L.L.P.

(57) ABSTRACT

An engaging member for attaching an upholstery material to a cushion member, which has a positioning member at least one lengthwise terminal end. The positioning member places the starting end of loop engaging element portion in precise position in the groove of the cushion member. The engaging member is long and flexible and bends in conformity with the complicated shape of the curved groove. The method of producing an upholstered cushion molding using the engaging member improves the working efficiency.

4 Claims, 8 Drawing Sheets

LOCKING CONNECTION MEMBER OF COVERING MATERIAL AND METHOD OF MANUFACTURING COVERED CUSHION FORMED BODY

TECHNICAL FIELD

The present invention relates to an engaging member which is used for fixing an upholstery material (covering material) on to a cushion molding (cushion member) used in the production of automotive seats, etc. The present invention further relates to a method of producing an upholstered cushion molding using the engaging member.

BACKGROUND ART

A method of attaching an upholstery material to a cushion molding (cushion member), which is a representative of foamed moldings, for producing an automotive seat (hereinafter may be simply referred to as "seat") includes a hog ring method in which the metal wires embedded in both a cushion member and an upholstery material are fixed by a metal ring; an adhesive method in which a cushion member and an upholstery material are fixed by an adhesive; and a method in which a hook surface fastener made of a woven or knitted fabric or plastics is embedded in a cushion member by a mold-in process and a loop surface fastener sewed on the back surface of upholstery material is fixed to the hook surface fastener by engagement.

Recently, an engaging member which is applicable to curved surfaces of seats for use in a surface fastener mold-in process is proposed.

For example, an engaging member which comprises a long flexible rod having a circular cross-section and mold-in hook engaging elements formed on the surface thereof is disclosed (Patent Document 1). Generally, the engaging member is integrally molded-in onto the bottom of narrow groove formed on the surface of a cushion member. An upholstery material is fixed to the cushion member by attaching loop engaging elements which correspond to the shape of the engaging member to the back surface of the upholstery material and then engaging the both engaging elements by pushing the loop engaging elements into the groove.

Various proposals are made on the loop engaging elements to be fitted to the upholstery material. For example, a loop engaging member comprising a flexible ribbon plate and loop engaging elements formed on one surface thereof is disclosed (Patent Document 2). Both the lengthwise extending ends of the loop engaging member are sewed to the superposed edge portions of two pieces of upholstery materials so that the loop engaging elements face outwardly. Then, the upholstery material is fixed to the cushion member by pushing the loop engaging elements facing outwardly into the groove.

In another proposed method of fixing an upholstery material to a cushion member, a cylindrical surface fastener is used, in which loop engaging elements are formed along the lengthwise direction partly on the surface thereof and a portion for fixing an upholstery material is formed along the lengthwise direction on the surface having no engaging element. The fixing portion extends outwardly and perpendicularly to the array of the loop engaging elements. Two pieces of upholstery material are fixed to the fixing portion by sewing at their edges and then the loop engaging elements are pushed into the groove of a cushion member to fix the upholstery material to the cushion member (Patent Document 3). The engaging member of Patent Document 3 easily bends in conformity with the curved engaging member on the bottom of curved groove of the cushion member.

Generally, the mold-in hook engaging elements are formed in a narrow groove on the surface of cushion member. In case of using any of the engaging members holding the upholstery material proposed by Patent Documents 1 to 3 for fixing the upholstery material to the cushion member, it is extremely difficult to precisely align the starting end of the loop engaging elements in the engaging member holding the upholstery material to the starting end of the hook engaging elements on the cushion molding. If both the starting ends are positioned distortedly or out of line, the upholstery material is wrinkled to spoil its appearance. Therefore, it is necessary to release the engagement, detach the upholstery material from the engaging member, and then attach another upholstery material to the engaging member.

Patent Document 4 discloses a method of precisely positioning an upholstery material to a cushion member, in which an array of loop engaging elements is sewn to the back surface of an upholstery material and a guide plate is disposed along the array of loop engaging elements, and the guide plate is inserted into a slit formed on the bottom of groove on the cushion member to place the upholstery material in precise position.

However, when the cushion member has a three-dimensionally curved complex surface (generally, a seat for luxury cars has a three-dimensionally curved complex surface for fitting to occupant's body), it is necessary to cut or bend the guide plate so as to fit the three-dimensionally curved surface. If the guide plate is used in the seat area or the back, the occupant feels uncomfortable because of rigid guide plate. Therefore, the position to which the guide plate is applicable is limited. In addition, the heavy guide plate increases the weight of car body and also increases production costs.

Patent Document 1: Japanese Patent 3255384
Patent Document 2: JP 2003-79976A
Patent Document 3: JP 2005-418A
Patent Document 4: JP 2006-141619A

DISCLOSURE OF THE INVENTION

As described above, in case of using known engaging members holding an upholstery material, it is extremely difficult to precisely align the starting end of loop engaging elements in the engaging member holding the upholstery material to the starting end of hook engaging elements on the cushion molding. If both the starting ends are positioned distortedly or are not in line with each other, the upholstery material is wrinkled to spoil its appearance. Therefore, it is necessary to release the engagement, detach the upholstery material from the engaging member, and then attach another upholstery material to the engaging member. Thus, the improvement of working efficiency has been required.

The method of positioning using a guide plate is difficult to apply to a complex curved shape.

An object of the present invention is to solve the above problems and provide a flexible long engaging member for upholstering which is easily and precisely positioned to the groove of a cushion member and easily bends along the complex curved shape of groove. Another object of the invention is to provide a method of producing an upholstered cushion molding with improved working efficiency. Still another object of the invention is to provide an upholstered cushion molding.

As a result of extensive research, the inventors have found that the above objects are achieved by an engaging member having on at least one lengthwise end thereof a positioning member which enables to bring the starting end of loop engaging elements and the starting end of hook engaging elements formed on a cushion molding into a line. The invention is based on this finding.

Namely, the present invention relates to:

(1) an engaging member for fixing an upholstery material to a cushion molding, wherein:

the engaging member is a strip of a base fabric having a first main surface and a second main surface opposite to the first main surface;

the engaging member comprises a main portion and a positioning member attached to at least one lengthwise terminal end of the main portion, the main portion having an array of loop engaging elements formed on a part of the second main surface along a lengthwise direction of the strip of the base fabric and regions for forming a connecting portion of the upholstery material at both lateral sides of the array of loop engaging elements along the lengthwise direction;

the regions at both the lateral sides of the array of loop engaging elements are opposed to each other with the first main surface inside, thereby forming the connecting portion of the upholstery material and a tubular portion; and the positioning member is disposed such that a starting end of the array of loop engaging elements engages with a starting end of an array of hook engaging elements which is formed in a groove of the cushion molding;

(2) the engaging member of (1), wherein:

a resin layer A and/or resin layers B is formed on the first main surface;

the resin layer A is formed at a central portion discontinuously along the lengthwise direction of the strip of the base fabric;

the resin layer B is formed at both lateral edge portions of the strip of the base fabric continuously or discontinuously along the lengthwise direction of the strip of the base fabric;

a region having no resin layer is formed between the resin layer A and the resin layers B at the lateral edge portions; and the resin layers B at the lateral edge portions are opposed to each other with the first main surface inside to form the connecting portion of the upholstery material;

(3) the engaging member of (1) or (2), wherein the positioning member has a projected portion which is capable of inserting into a positioning recess formed on the cushion molding;

(4) the engaging member of (1) or (3), wherein a flexible rod core is inserted through the tubular portion and the positioning member having a projected portion which is fit into a positioning recess formed on the cushion molding is attached to at least on terminal end of the flexible rod core;

(5) the engaging member of any one of (1) to (4), wherein the positioning member has a projected male part which is capable of fitting into a positioning female part formed on the cushion molding;

(6) a method of producing an upholstered cushion molding comprising the steps of:

sewing an upholstery material onto a connecting portion of the engaging member of any one of (1) to (5);

fitting a positioning member of the engaging member into a positioning recess which is formed on a bottom of a groove having an array of hook engaging elements of the cushion molding;

placing a starting end of loop engaging elements of the engaging member on a starting end of the hook engaging elements of the cushion molding; and pushing the engaging member onto the array of hook engaging elements on the bottom of the groove by starting from the starting end of the array of loop engaging elements successively toward a lengthwise direction, thereby engaging the loop engaging elements with the hook engaging elements and fixing the upholstery material to the cushion molding; and (7) an upholstered cushion molding produced by the method of (6).

REFERENCE NUMERALS

1: main portion of engaging member
2, 12: base fabric

3: first main surface
4: second main surface
5, 13: loop engaging element portion
7: connecting portion
8: fixed portion of first main surfaces
9: tubular portion
10: hollow space
10R: flexible rod core
10W: thread core
11: main portion of engaging member having resin layer
14: resin layer A
15, 16: resin layer B
17, 18: connecting portion (attaching portion)
20: cap-shaped positioning member
21: cushion molding
22: bottom of groove
23: array of hook engaging elements
24: hole
Sl: starting end of loop engaging elements
Sf: starting end of hook engaging elements
30, 40, 50, 80: positioning member
60: snap-fitting positioning member
70: snap-fitting positioning member

BEST MODE FOR CARRYING OUT THE INVENTION

Figure 1A:
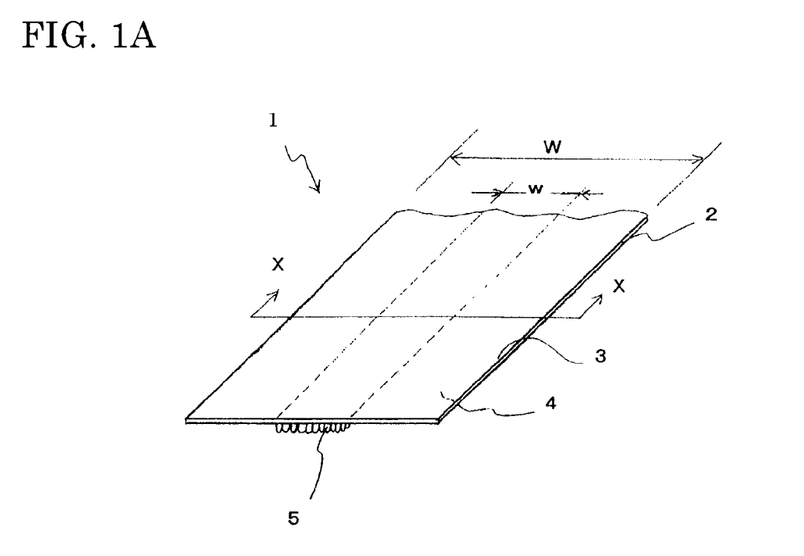
FIG. 1A is a schematic perspective view showing an example of the main portion of engaging member.
Figure 1B:
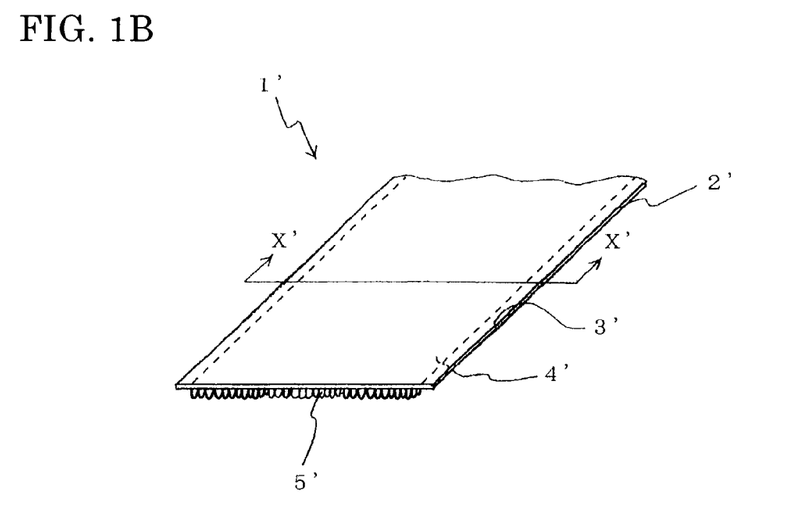
FIG. 1B is a schematic perspective view of an example of another main portion.
Figure 3A:
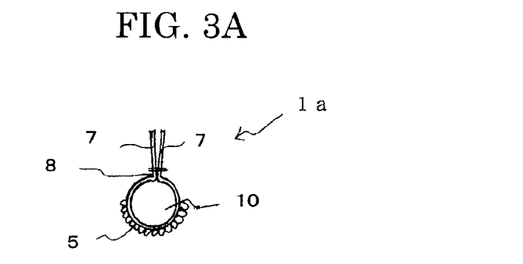
FIG. 3A is a schematic view showing an embodiment of using the main portion of engaging member.

The base fabric and the array of loop engaging elements which form the main structure of the engaging member are explained with reference to FIG. 1. In a main portion 1 of engaging member shown in FIG. 1A, a base fabric 2 having a total width of W has a first main surface 3 and a second main surface 4. On the second main surface 4, an array of loop engaging elements 5 projecting from the surface is provided in a width of w. As shown in FIG. 3A, each of the lug portions on both sides of the loop engaging element portion 5 has a width enough to work as a connecting portion 7 for attaching an upholstery material by sewing, etc. In a main portion 1' of engaging member shown in FIG. 1B, projecting loop engaging elements 5' are formed on nearly whole surface of a base fabric 2' except for the narrow lug portions on both sides of the second main surface 4'. In another embodiment (now shown), the projecting loop engaging elements may be formed throughout the whole surface of the base fabric without leaving the lug portions at its both edges. Such main portion of engaging member is obtained by cutting a wide fabric having loop engaging elements formed on its surface into a desired width.

As shown in FIG. 3A, a strip of main portion 1 is folded double with the first main surface inside and the first main surfaces opposite to each other are fixed at a fixed portion 8 by sewing, heat fusion, or adhesive. The inside of a tubular portion 9 is a hollow space 10. The fixed portion 8 may be formed by sewing an upholstery material.

Figure 3B:
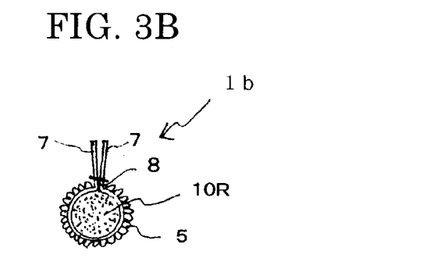
FIG. 3B is a schematic view showing another embodiment of using the main portion.

As shown in FIG. 3B, the tubular portion may be formed only from the loop engaging element portion 5 and a flexible rod core 10R may be inserted into the inside thereof. The outer surface of the flexible rod core and the first main surface may be bonded by adhesive, if necessary. In FIG. 3B, the flexible rod core 10R fills the inside of the tubular portion. However, a core having a smaller outer diameter is also usable as long as the core ensures the insertion of the array of loop engaging elements into the groove of a cushion molding.

The base fabric of the loop engaging element portion may be either of knitted fabric or woven fabric. Preferred is an engaging member made of a knitted base fabric because of its good elastic property and an engaging member having a base fabric on which the loop engaging elements are formed by Raschel knitting is particularly preferred. An engaging member made of a woven fabric of warp yarns, weft yarns, and loop yarns is less flexible because of a hard structure of the base fabric and its application to a complex curved groove is limited. An engaging member having Raschel-knitted loop engaging elements has a loose structure and large space between knitted yarns and is therefore easily deformable.

In the following, the invention is described mainly in the case of forming the loop engaging elements on a knitted base fabric by knitting.

The fiber for the loop engaging elements may be the fibers used for the production of usual fabrics and examples thereof include polyamide fibers, polyester fibers and polyolefin fibers. Multifilaments are preferably used and may be mixed with monofilaments. For the yarn for forming loops, multifilament in which preferably 5 to 50, more preferably 10 to 40, and still more preferably 15 to 35 non-twisted, straight filaments are collected together, so-called grey yarn, is preferably used. The fineness of multifilament is preferably 100 to 250 dtex. For the multifilament for forming the ground fabric on which the loop engaging elements are formed, a false-twist yarn or doubled twist yarn thereof each having a fineness of 200 to 400 dtex and the filament number of 50 to 150 is preferably used.

The loop engaging element portion is formed by a known method using a known knitting machine. The loop engaging element portion is composed of a base fabric and loop engaging elements formed on one surface thereof. The width of the loop engaging element portion (width of the base fabric thereof) is selected according to the size of cushion member and the width and depth of groove and preferably 10 to 80 mm. The height and density of the loop engaging elements is determined according to the desired engaging force with the hook engaging elements. The height is preferably 1 to 5 mm and the density (a loop of multifilament is counted as one element) is preferably 20 to 80/cm$^2$. The loop engaging elements may be formed on the whole surface of the base fabric. However, as described below, all the loop engaging elements formed on the whole surface does not necessarily participate in the engagement with the hook engaging elements formed on the bottom of groove. Therefore, the loop engaging elements are formed more preferably only on the central portion along the longwise direction of the base fabric so as to effectively engage with the hook engaging elements disposed on the bottom of groove.

The elastic property of the loop engaging element portion (base fabric having the loop engaging elements on its one surface) is evaluated by the elongation and the elastic modulus. The elongation in the lengthwise direction (longitudinal direction) is preferably 3% or more and more preferably 4 to 15%, and the elastic modulus is preferably 45% or more.

The elongation and the elastic modulus of the loop engaging element portion (surface fastener) were determined as follows. A loop engaging element portion with T cm width was held vertically and an initial load of T×2.5 g (2.5 g/cm) was applied to the free lower end. The length (initial length (a)) was measured after 30 s of loading. Then, the load was changed to T×250 g (250 g/cm) and after 30 s the length (length under loading (b)) was measured. After unloading, the test piece was left stand for 2 min. Then, the initial load was applied and after 30 s the length (length under repeated loading (c)) was measured. The elongation is a quotient of the amount of elongation under loading divided by the initial length and represented by 100×(b−a)/a. The elastic modulus is a quotient of the amount of recovery divided by the amount of elongation under loading and represented by 100×(b−c)/(b−a).

In the present invention, the loop engaging element portion formed by Raschel-knitting the base fabric and the loop engaging elements is preferably used. The Raschel-knitted loop engaging element portion is produced by a known method using a known Raschel-knitting machine.

The surface (first main surface) opposite to the surface having the loop engaging elements (second main surface) may be provided with a resin layer. The resin layer is formed at the central portion and/or both lateral edge portions along the lengthwise direction of the loop engaging element portion. The resin layer formed at the central portion (resin layer A) is discontinuous in the lengthwise direction. The resin layers formed on both edge portions (resin layer B) may be continuous or discontinuous in the lengthwise direction and preferably continuous.

The resin layer A reinforces the loop engaging element portion from the back side. If reinforced by the resin layer A, the operation of pushing the loop engaging elements onto the hook engaging elements on the bottom of groove is easy and a more firm engagement is preferably obtained. If the shape of the groove is two-dimensionally or three-dimensionally complex, it is necessary for the engaging member, particularly the loop engaging element portion, to freely deform in conformity with the shape of the groove. Therefore, the resin layer A is made discontinuous in the lengthwise direction. If discontinuous, the portion provided with the resin layer A (having the loop engaging elements on its back surface) changes its shape easily to facilitate the operation of pushing the engaging member into the groove having a complex shape.

Two resin layers B form a portion for connecting or attaching an upholstery material to the engaging member. In addition, these resin layers are effective for maintaining the engaging member in a straight or curved shape in conformity with the shape of groove during the operation of pushing the engaging member into the groove. Therefore, the operation of fixing the upholstery material becomes easy and the upholstery material is fixed in precise position along the groove.

The resin for forming the resin layers A and B is preferably soft and compatible with the fibers forming the loop engaging elements. If the loop engaging elements are made of polyester fibers or polyamide fibers, a resin, such as synthetic rubber, polyurethane, soft polyester, soft polyamide, soft polyolefin resin, and acrylic resin, is usable.

The resin layers A and B may be formed by a known method, such as coating method (hot melt method and squeezing method), adhesive method, and fuse-bonding method, for example, by coating the above resin in a coating amount of 50 to 300 g/m$^2$ while allowing the resin to partly penetrate into the base fabric of the loop engaging element portion. The width of the resin layers A and B is determined according to the width of the engaging member and the width of each resin layer is preferably 3 to 30 mm. The thickness is preferably 0.1 to 4 mm. The width and thickness of the resin layer A may be the same or different from those of the resin layer B. Those of two resin layers B may be also the same or different. The resin layers A and B may be continuous or discontinuous in the with direction of the engaging member.

The long loop engaging element portion preferably has a deformability enough to easily fixing the upholstery material in precise position. Therefore, in addition to the base fabric of the loop engaging element portion, the resin layers A and B preferably have a moderate flexibility. The deflection resistance of the base fabric having no resin layer is preferably 20 g or less, more preferably 10 to 20 g, and still more preferably 15 to 18 g. The deflection resistance of the base fabric provided with the resin layer A or B is preferably 25 g or more, preferably 25 to 80 g, and still more preferably 30 to 60 g. The above deflection resistances are values in the width direction of a strip of base fabric. Within the above ranges, the engaging member is not excessively flexible and easily handled. In addition, the deformability is moderate and the engaging member holding an upholstery material is easily deformed along the groove.

The deflection resistance was measure as follows by using a deflection resistance tester "HOM-200" manufactured by Daiei Kagaku Seiki MFG. Co., Ltd. A test piece (base fabric with 40 mm width and 200 mm length) having a resin layer or no resin layer was placed on a slit (20 mm width) of the deflection resistance tester with the lengthwise direction of test piece perpendicular to the slit. Then, the test piece was pushed downward with a 2 mm-wide blade. The load at which the test piece was deformed downward by 10 mm under the slit was measured. The measured load is employed as the deflection resistance. The test piece was pushed from the first surface.

Figure 4:
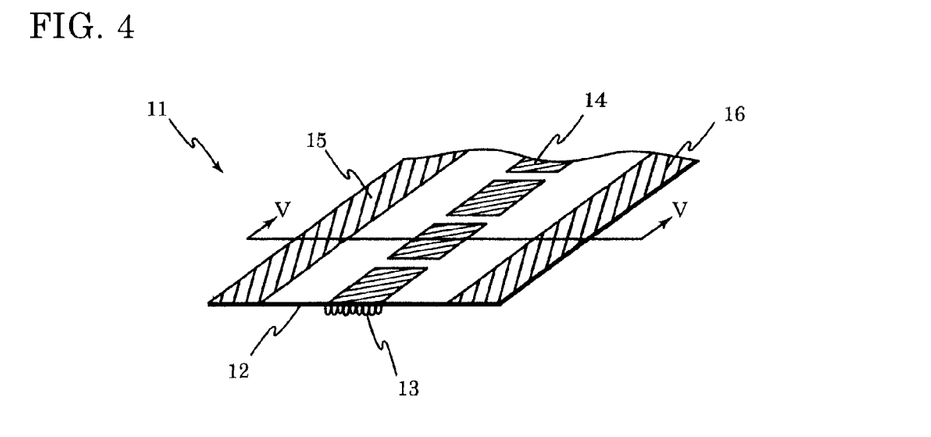
FIG. 4 is a schematic perspective view showing the main portion of engaging member having a resin layer.
Figure 5:
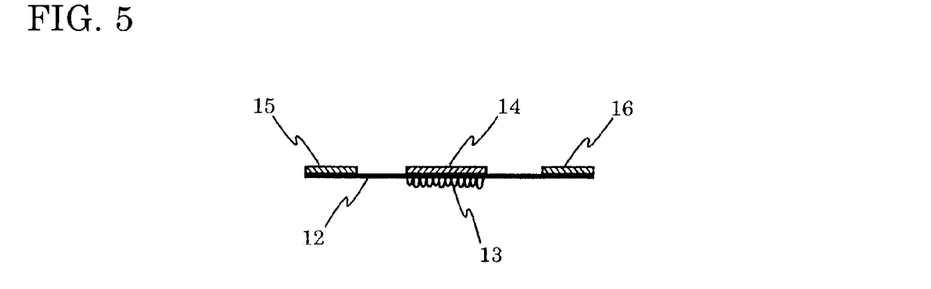
FIG. 5 is a cross-sectional view taking along the line V-V of FIG. 4.

The engaging member having the resin layer will be described with reference to the drawings. FIG. 4 is a schematic perspective view showing an example of the main portion 11 of engaging member. FIG. 5 is a cross-sectional view taking along the line V-V of FIG. 4.

In FIGS. 4 and 5, projecting loop engaging elements 13 are formed on the central portion of the second main surface of a base fabric 12 along the lengthwise direction of the engaging member 11. On the central portion of the first main surface of the base fabric 12, a resin layer 14 (resin layer A) is formed discontinuously in the lengthwise direction of the engaging member 11. The lengths and shapes of the continuous portion and the discontinuous portion of the resin layer 14 are determined according to the desired deformability. The resin layer 14 is formed so as to reinforce the loop engaging elements 13 from its back side. The width of the resin layer A may be the same as or different from that of the array of loop engaging elements 13.

On both edge portions extending along the lengthwise direction of the engaging member 11, resin layers 15 and 16 (resin layer B) are formed. A lug portion having no resin layer may be formed on the widthwise outer side of each of resin layers 15 and 16, if necessary. A resin layer is not formed on the area between the resin layer 14 and the resin layers 15 and 16. The width of this area is preferably 2 to 10 mm. This area facilitates the operation of forming the connecting portion for attaching the upholstery material by raising both edge portions having the resin layers. In addition, with such area, the engaging member has a moderate flexibility and deformability.

Figure 6:
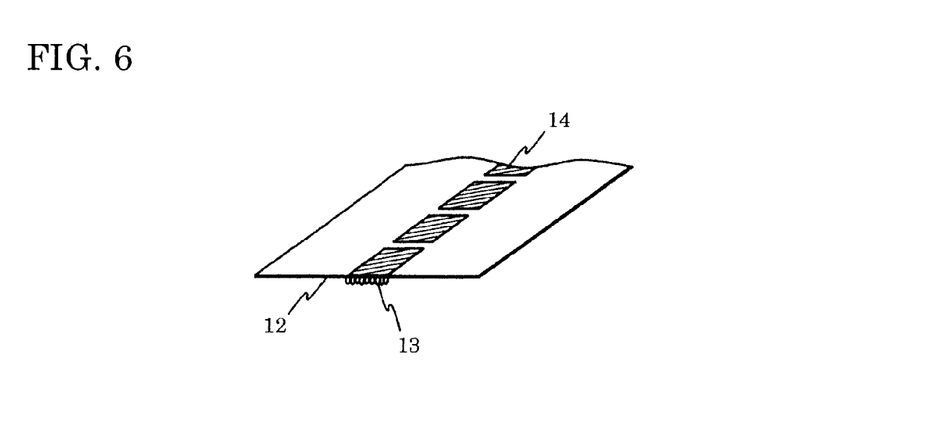
FIG. 6 is a schematic perspective view showing the main portion of another engaging member having a resin layer.
Figure 7:
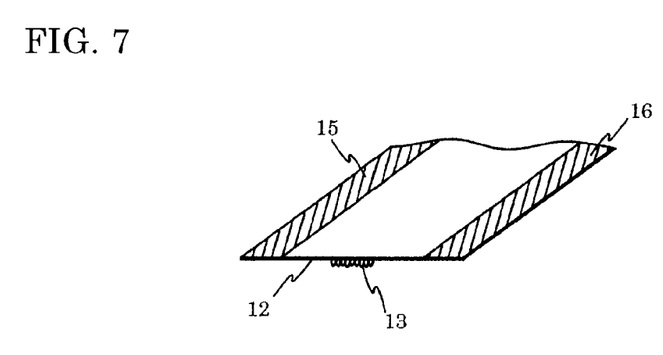
FIG. 7 is a schematic perspective view showing the main portion of still another engaging member having a resin layer.

On the surface of the engaging member, only the resin layer 14 may be formed (FIG. 6) or only resin layers 15 and 16 may be formed (FIG. 7).

Figure 8:
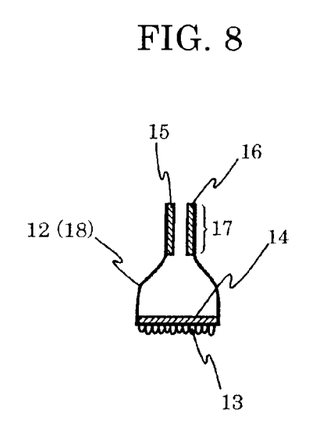
FIG. 8 is a schematic view showing an embodiment of using the main portion of engaging member having a resin layer.
Figure 9:
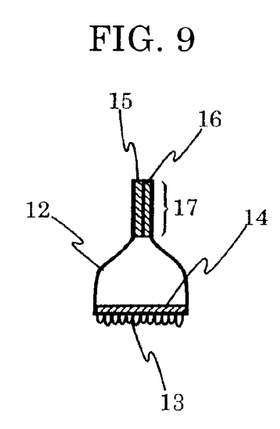
FIG. 9 is a schematic view showing another embodiment of using the main portion of engaging member having a resin layer.

FIGS. 8 and 9 show an embodiment of using the engaging member. For example, both the resin layers 15 and 16 shown in FIG. 4 are raised with the first main surface inside and opposed to each other, thereby forming a connecting portion 17 for attaching the upholstery material. As shown in FIG. 8, two pieces of upholstery material (not shown) are inserted into the space between the resin layer 15 and the resin layer 16, and the upholstery material is fixed to the resin layers 15 and 16 by sewing or adhesive, thereby attaching the upholstery material to the engaging member. As shown in FIG. 9, the opposing resin layer 15 and resin layer 16 may be brought into close contact with each other, and then, two pieces of upholstery material are fixed to the outsides of the resin layers respectively, thereby attaching the upholstery material to the engaging member. The connecting portion 17 may be formed into a integral part by impregnating a resin into the resin layer 15 and the resin layer 16 shown in FIG. 9. Although the resin layer 14 shown in FIGS. 8 and 9 is nearly flat, it may be slightly concaved or convexed according to the shape of the array of hook engaging elements (hook surface fastener) on the bottom of groove. As shown in FIGS. 8 and 9, the side 12 extending upwardly from the resin layer 14 is preferably flat and free from loop engaging elements. The loop engaging elements on the side 12, if exist, may interfere with the insertion of the engaging member into the narrow groove to reduce the working efficiency and may prevent the engagement in precise position between the loop engaging elements 13 with the hook engaging elements on the groove bottom.

Next, the positioning member will be described. The positioning member is disposed at least one lengthwise end of the engaging member and outside the starting end of the loop engaging elements.

The positioning member is properly positioned so that the starting end of the loop engaging elements can be precisely put on the starting end of the hook engaging elements of the cushion molding.

A part for receiving the positioning member can be formed on the groove at a predetermined distance from its end or formed slightly outside the end of the hook engaging element portion during the mold-in production of the cushion molding.

Since the engaging member of the invention is used for the production of automotive seats, etc., a positioning hole is preferably formed on the groove and the positioning member is preferably a projected part which can be inserted into the positioning hole, because the direction of insertion is the same as the direction of pushing the upholstery material.

The first embodiment of the positioning member will be described with reference to the drawings.

Figure 10:
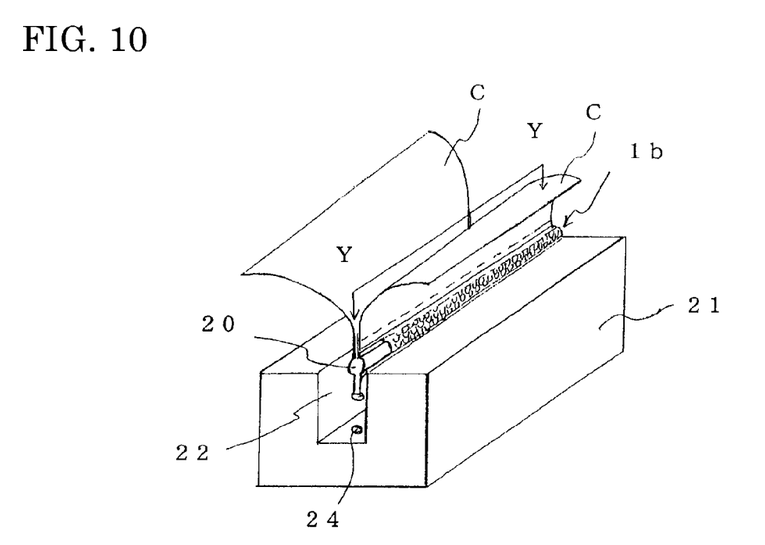
FIG. 10 is a schematic perspective view showing an example of the method of fixing an upholstery material attached to an engaging member to a groove of a cushion member.

FIG. 10 is a schematic view showing an example of the method of fixing an upholstery material C attached to an engaging member 1b to a groove 22 of a cushion molding 21. As shown in the cross-sectional view of FIG. 11, upstanding hook engaging elements 23 are formed on the bottom of the groove in the cushion molding 21. A hole 24 is formed at a predetermined distance from the starting end Sf. In this embodiment, an engaging member 1b has a flexible rod core 10R in the tubular portion inside the loop engaging element portion 5, as shown in FIG. 3B. A cap-shaped positioning member 20 is disposed at a predetermined distance from the starting end Sl of the loop engaging elements.

Figure 11:
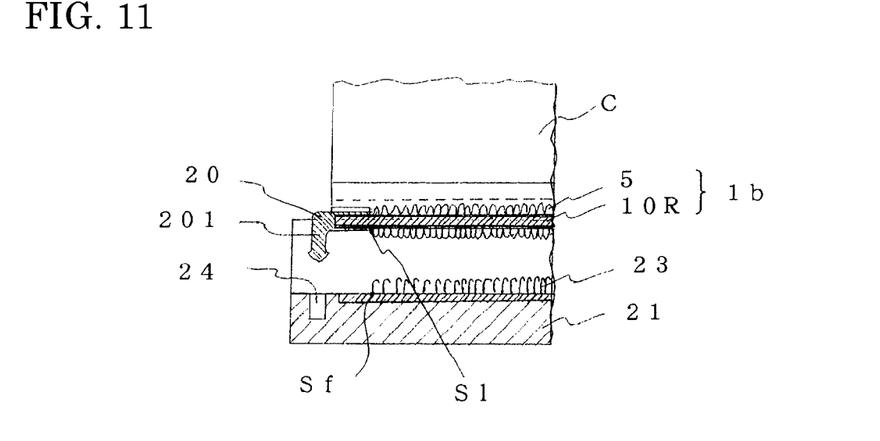
FIG. 11 is a cross-sectional view taken along the line Y-Y of FIG. 10.

The cap-shaped positioning member 20 has a projection 201 with an expanded head at its end and is capable of being inserted into a hole 24 formed on the cushion molding 21.

Since the projection 201 has an expanded head, the friction between the projection 201 and the hole 24 is large. Therefore, the rising and shaking of the projection 201 inserted into the hole 24 is minimized to ensure the precise positioning.

In addition, the insertion of the projection is easily confirmed by the feeling of insertion of the positioning member 20 into the hole 24.

Figure 12A:
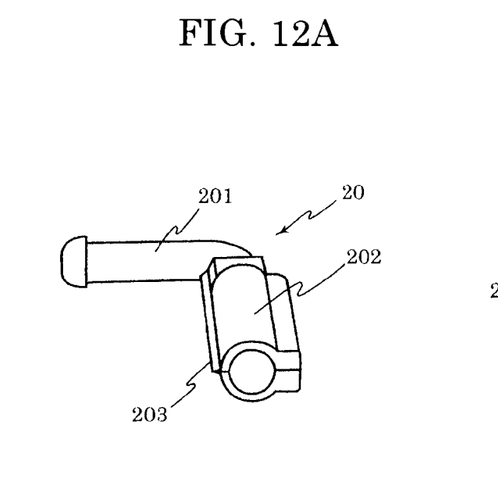
FIGS. 12A and 12B are schematic views showing cap-shaped positioning members.
Figure 12B:
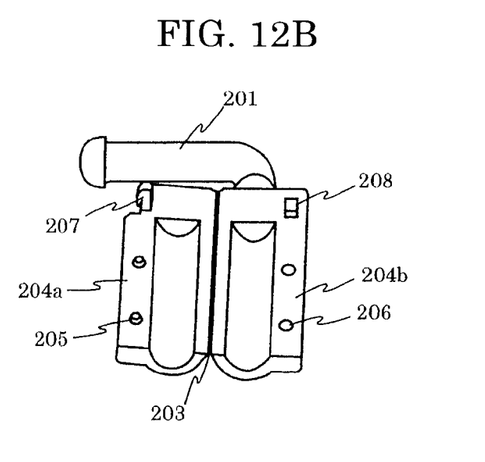

An example of the cap-shaped positioning member is described with reference to FIG. 12. The cap-shaped positioning member 20 perspectively shown in FIG. 12A is an injection molding of a thermoplastic resin and has the projection 201 having an expanded head at the front end and a gripping portion 202 for gripping the flexible rod core 10R and the base fabric and/or loop engaging elements (main portion of engaging member) at the rear end. As shown in the opened view of FIG. 12B, the gripping portion 202 is composed of a pair of gripping halves 204a and 204b which are joined by a joint 203. The gripping half 204a has two small projections 205 and a hook projection 207. The cooperating gripping half 204b has two holes 206 for receiving the small projections 205 and a square hole 208 to which the hook projection 207 is snap-fitted. The main portion of engaging member is put between the gripping halves 204a and 204b. By inserting the hook projection 207 into the square hole 208, the small projections 205 enter into the holes 206 simultaneously, thereby sandwiching the main portion of engaging member. The tip end of the hook projection 207 is bended toward the joint to allow the insertion thereof into the square hole 208. After complete insertion, the hook projection 207 recovers outwardly and the hook fits tightly to the square hole 208. Since the closed gripping portion is difficult to open, the positioning member 20 hardly detaches from the main portion of engaging member. To grip the main portion of engaging member more firmly, the gripping halves and the main portion of engaging member may be bonded to each other by adhesive or heat fusion, if necessary.

Figure 13:
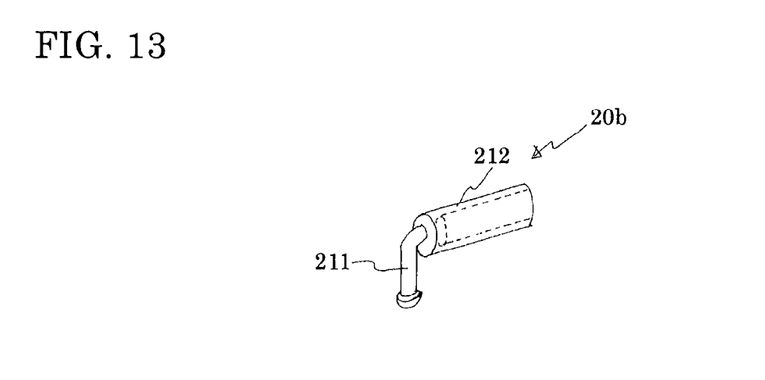
FIG. 13 is a schematic perspective view showing a fitting-type cap-shaped positioning member.

A cap-shaped positioning member may be designed so as to receive the main portion of engaging member by fitting. As perspectively shown in FIG. 13, the fitting-type positioning member 20b has a projection 211 with an expanded head at its front end and a fitting portion 212 into which the main portion of engaging member is fitted at its rear end. The inner diameter of the fitting portion 212 matches the outer diameter of the main portion of engaging member. The fitting portion 212 does not need to be perfectly cylindrical for securely receiving the main portion of engaging member. For example, it is recommended to slit the open end so as to allow the opening to expand when inserting the main portion of engaging member. In addition, like a point protector for pencil, the fitting portion may be reverse-tapered toward the opening end for easy insertion so as to securely receiving the inserted main portion of engaging member at the inner part thereof.

The flexible rod core 10R of the engaging member 1b may be a resin body made of a flexible resin or a foamable resin or a hollow pipe made of a flexible resin. Example of the flexible resin includes soft polyolefin resins, polyester resins and elastomers. Example of the foamable resin includes foamable polyethylene, foamable polystyrene, and foamable polyurethane.

A metal hollow pipe and a wire such as steel wire may be used, if necessary.

When using a core made of a wire such as steel wire or a plastic slender rod made of a synthetic resin, each end thereof is bent downwardly and made into a loop so as to fit the hole 24 on the bottom of groove 22 in the cushion molding 21. The loop works as the positioning member.

Figure 16:
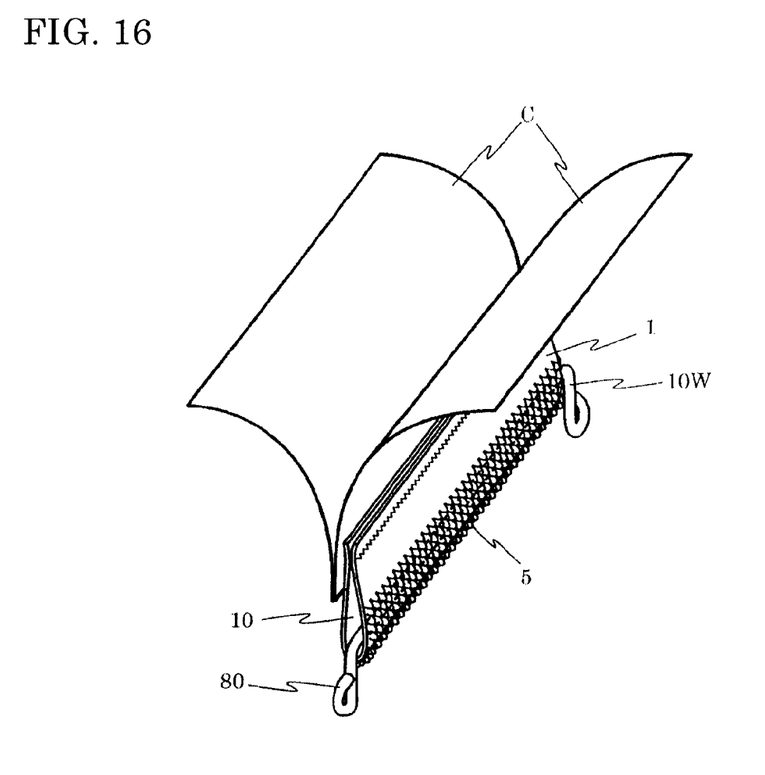
FIG. 16 is a schematic perspective view showing an upholstery material attached to another engaging member.

This embodiment is explained with reference to FIGS. 16 and 17. In the engaging member shown in FIG. 16, a main portion 1 is folded double with the first main surface inside. The upper side where the first main surfaces are opposed to each other works as a connecting or attaching portion. Two pieces of upholstery material C are sewed on the attaching portion. A core 10W, for example a steel wire, has a small diameter for allowing the insertion thereof through a hollow space 10. The core 10W is bent into L-shape toward the cushion molding at its both end portions and each bent portion is further bent into a loop which works as a positioning member 80. By inserting the core 10W through the hollow space 10, the engaging member holding the upholstery material as shown in FIG. 16 is obtained.

Figure 17:
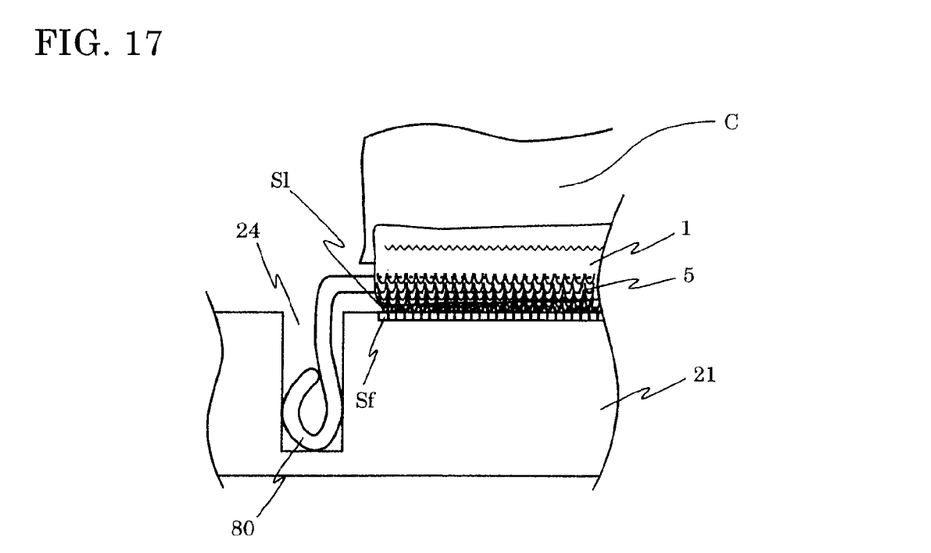
FIG. 17 is a schematic transparent view showing the engagement of the engaging member with the groove of a cushion molding shown in FIG. 16.

As shown in FIG. 17, the loop positioning member 80 is fitted into the positioning hole 24 so as to put the starting end Sl of the loop engaging elements precisely on the starting end Sf of the hook engaging elements and then the array of loop engaging elements are engaged with the array of hook engaging elements.

In a preferred embodiment, the core 10W is bonded to the inside of the hollow space 10 by adhesive, etc. in the vicinity of the starting end of the loop engaging elements at least in the side from which the attaching operation of the upholstery material C is started, because the positioning member 80 is fixed immovably and therefore the starting end of the loop engaging elements is more precisely put on the starting end of the hook engaging elements.

The upholstery material C is fixed to the groove 22 of the cushion molding 21 by fitting the projection 201 of the positioning member into the hole 24 of the cushion molding; putting the starting end Sl of the loop engaging elements precisely onto the starting end Sf of the hook engaging elements; and pushing the loop engaging elements onto the hook engaging elements on the bottom of groove from the starting end Sl toward the lengthwise end of the array of loop engaging elements. By this method, the upholstery material C is finely fixed to the cushion molding without wrinkling and sagging.

The upholstery material may be a woven or knitted fabric, a nonwoven fabric of natural fiber or synthetic fiber, a synthetic resin sheet of foamed polyethylene, foamed polystyrene, or foamed polyurethane, a natural or artificial leather sheet, or a laminate thereof. The cushion molding may be formed from foamed polyurethane, a laminate of synthetic fibers or a felt of natural fiber.

Next, the second embodiment of the positioning member will be described with reference to the drawings.

Figure 14:
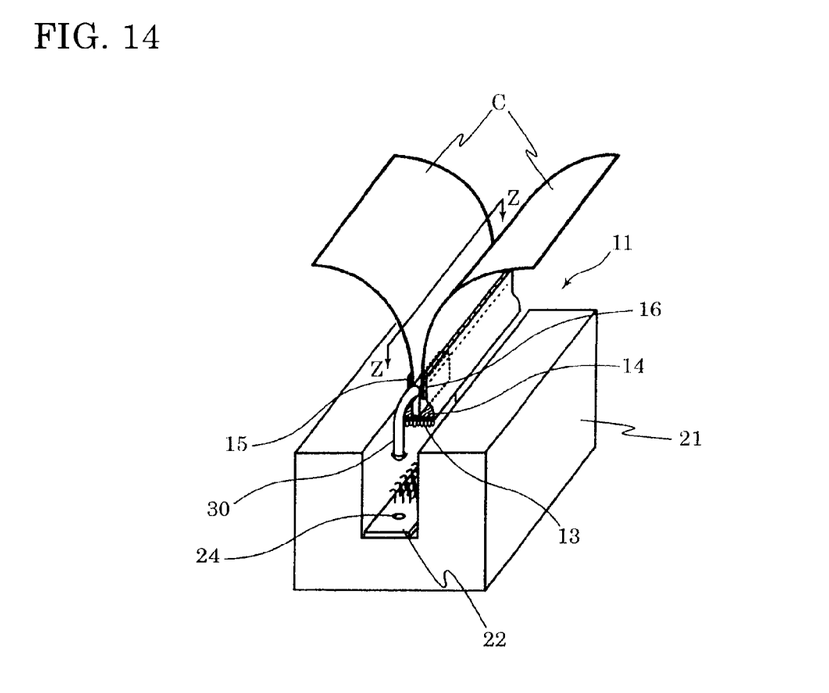
FIG. 14 is a schematic perspective view showing an example of the method of fixing an upholstery material attached to an engaging member having a resin layer to a groove of a cushion member.
Figure 15:
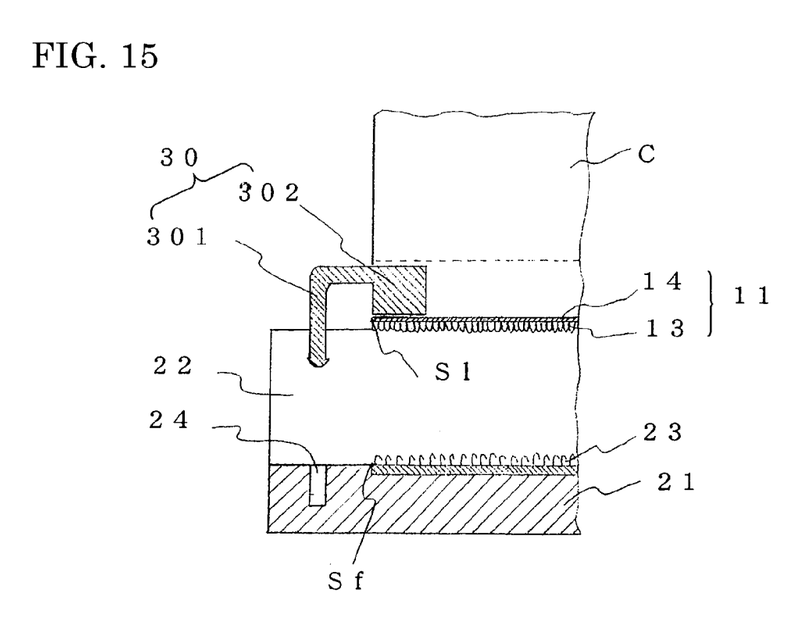
FIG. 15 is a cross-sectional view taken along the line Z-Z of FIG. 14.

FIG. 14 shows an engaging member 11 attached with a positioning member before attaching to a cushion molding 21, in which a positioning member 30 is fixed by inserting its flat portion between resin layers 15 and 16 of a connecting portion 17. As shown in FIG. 15 by a cross-sectional view taken along the line Z-Z, the positioning member 30 has a projection 301 which is to be fitted into a hole 24 formed on the bottom of groove 22 and a flat portion 302 at its back end. Since it is practical for the production to fix the flat portion 302 to the connecting portion 17 as shown in FIG. 8 by sewing, the material and thickness of the positioning member 30 are selected from synthetic resin and thickness range so as to enable the sewing by machine. The projection 301 and the flat portion 302 may be separately molded and then united into an integral body, and preferably integrally molded by injection molding, etc. in view of production cost.

The upholstery material C is fixed to the groove 22 of the cushion molding 21 by fitting the projection 301 of the positioning member into the hole 24 of the cushion molding; putting the starting end Sl of the loop engaging elements 13 precisely onto the starting end Sf of the hook engaging elements 23; and pushing the loop engaging elements 13 onto the hook engaging elements 23 on the bottom of groove from the starting end Sl toward the lengthwise end of the array of loop engaging elements 13. By this method, the upholstery material C is finely fixed to the cushion molding without wrinkling and sagging.

Figure 18:
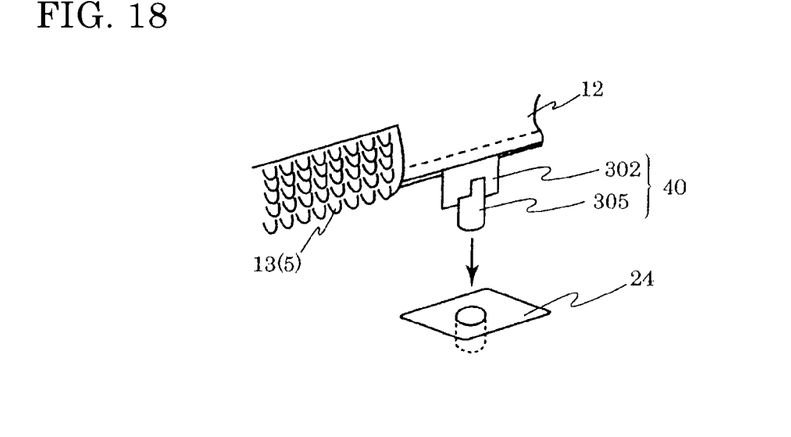
FIG. 18 is a schematic perspective view showing a positioning member having a flat portion.
Figure 19A:
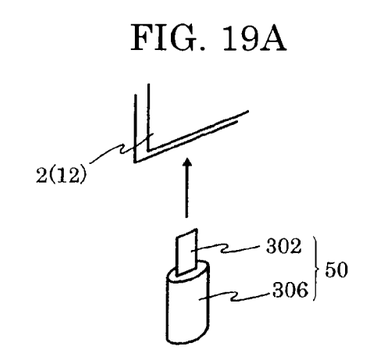
FIG. 19 is a schematic perspective view showing another positioning member having a flat portion.
Figure 19B:
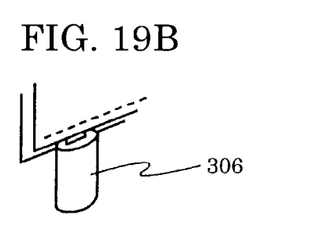

Another method of attaching the positioning member to the connecting portion of the engaging member through the flat portion of the positioning member is explained below. FIG. 18 is a perspective view showing a positioning member 40 opposite to a hole 24 on the bottom of groove, in which the positioning member 40 has a flat portion 302 and a cylindrical projection 305, and the flat portion 302 is fixed by sewing between a base fabric 12 or 2 at the area having no loop engaging elements 13 (5). FIG. 19A is a perspective view showing a positioning member 50 before attaching to the base fabric 12 or 2, in which the positioning member 50 has a cylindrical projection 306 and a flat portion 302 with the same width. FIG. 19B is a perspective view showing the positioning member attached to the base fabric.

The area of the base fabric 12 or 2 free from the loop engaging elements 13 (5) is preferably formed by forming the loop engaging elements 13 (5) with intervals along the lengthwise direction; by removing the formed loop engaging elements; or by embedding the loop engaging elements in a resin.

The flat portion 302 may be fixed between the opposed base fabrics 12 or 2 or may be fixed on the stacked base fabrics preferably by sewing by machine.

The hole as the positioning recess to be formed on the predetermined position of the bottom of groove is described above.

A female part into which the projection (male part) of the positioning member snap-fits may be provided in the positioning recess of the cushion molding. For example, the snap fit is designed such that the projection deforms inside during insertion and recovers after insertion. In another design, a male part inserted into a female part is firmly fitted by a spring pin disposed on the bottom of female part.

Figure 20:
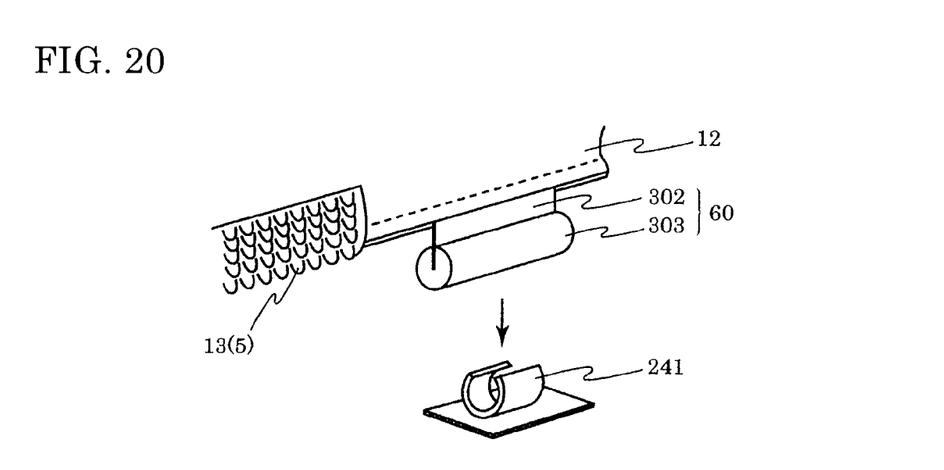
FIG. 20 is a schematic perspective view showing a snap-fitting positioning member.

FIG. 20 is a perspective view showing a combination of a positioning member 60 having a solid cylindrical part 303 and a partial cutaway hollow cylindrical receiver 241.

Figure 21:
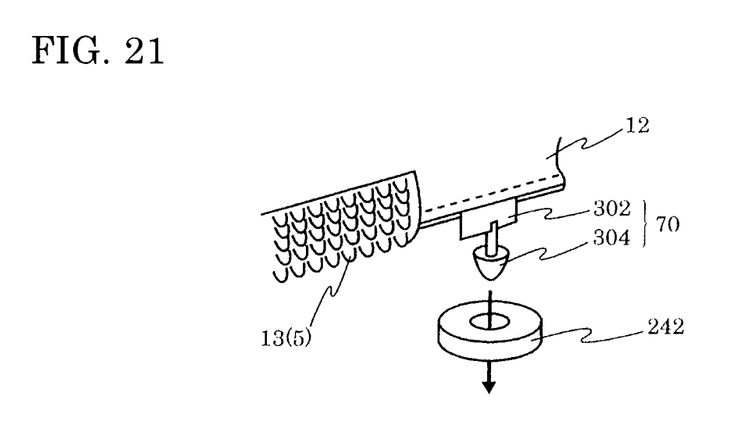
FIG. 21 is a schematic perspective view showing a snap-fitting positioning member.

FIG. 21 is a perspective view showing a combination of a positioning member 70 having an arrowhead projection 304 and a ring receiver 242 having an inner diameter mating with the outer diameter of the arrowhead.

With such a combination of fitting parts, the precise positioning between the loop engaging elements and the hook engaging elements is easily confirmed by the feeling and sound during assembling the fitting parts. Therefore, the operations of aligning the starting ends in a line precisely and attaching the upholstery material can be conducted efficiently.

The method of producing an upholstered cushion molding of the invention comprises the steps of:

sewing an upholstery material on the connecting portion of the engaging member;

fitting the positioning member of the engaging member into the hole or the fitting part provided in the hole which is formed at a predetermined distance from the starting end of the hook engaging elements on the groove of the cushion molding;

placing the starting end of the loop engaging elements of the engaging member precisely on the starting end of the hook engaging elements of the cushion molding;

pushing the engaging member onto the hook engaging elements on the bottom of groove by starting from the starting end of the loop engaging elements successively toward the lengthwise direction, thereby engaging the loop engaging elements with the hook engaging elements and fixing the upholstery material to the cushion molding.

To prevent the engagement between the hook engaging elements and the loop engaging elements before positioning the starting ends, it is recommended to cover the loop engaging elements with a release paper and pushing the engaging member into the bottom of groove while removing the release paper, thereby fixing the upholstery material to the cushion molding.

The present invention provides the upholstered cushion molding produce by the above method.

The present invention provides a flexible and long engaging member for attaching the upholstery material, which is easily placed into the groove of the cushion member and easily bends in conformity with the complicated shape of curved groove. The present invention further provides a method of producing an upholstered cushion molding which improves the operation efficiency, because the redoing of operation due to the out of place between the hook engaging elements and the loop engaging elements can be avoided. The present invention further provides an upholstered cushion molding with good appearance without wrinkling and sagging of the upholstery material.

EXAMPLES

The present invention will be described in more detail with reference to the examples. However, it should be noted that the scope of the invention is not limited to the following examples.

Example 1

Production of Main Portion of Engaging Member

Figure 2A:
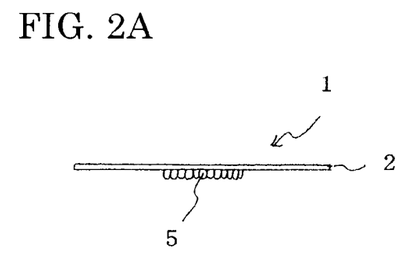
FIG. 2A is a cross-sectional view taking along the line X-X of FIG. 1A
Figure 2B:
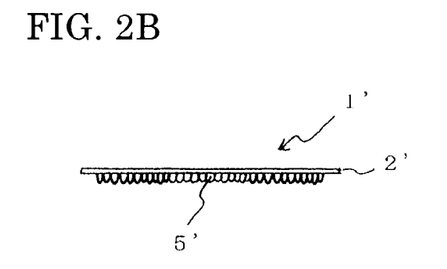
FIG. 2B is a cross-sectional view taking along the line X'-X' of FIG. 1B.

The following raw yarns were Raschel knitted to form a base fabric and loop engaging elements, thereby producing a main portion of engaging member.
 (1) Raw Yarn
 Chain yarn: PET finished yarn 330 T/96 F
 Weft insert yarn: PET finished yarn 330T/96F//2
 Loop yarn: PET grey yarn 167T/30F
 (2) Knit Structure
 Raschel knitting: 16 in gauge
 Warp density: 32 course/in
 Loop density: 160/in$^2$
 Loop height: 2 mm
 Tape width (W): 40 mm
 Central loop width (w): 10 mm
 Mass per unit area: 9 g/m$^2$
 (3) Elastic Property
 Elongation: 4%
 Elastic modulus: 48%
Production of Engaging Member The obtained main portion of engaging member is shown in FIG. 1 perspectively and in FIG. 2 cross-sectionally. On the central portion of the second main surface of the base fabric with 40 mm width, a 10 mm-wide array of loop engaging elements with a loop height of 2 mm was formed. The strip of base fabric (main portion of engaging member) was folded with the first main surface inside so as to oppose both the lengthwise edges to each other. A flexible rod core with an outer diameter of 3.5 mm made of a low density polyethylene was inserted through the hollow space while covering the outer surface of the flexible rod core with the array of loop engaging elements, as shown in FIG. 3B, thereby producing the engaging member before attaching the positioning member. The flexible rod core was fixed to the first main surface by a hot-melt adhesive. As shown in FIG. 3B, the portion 7 with a width of about 11 mm which extends above the fixed portion 8 of the first main surfaces works as a attaching or connecting portion of the upholstery material (herein after referred to as "portion for connecting upholstery material").

Two pieces of upholstery material C (tubular knitted fabric of polyester fibers manufacture by Kuraray Co., Ltd.) were sewed onto the portion for connecting upholstery material. Then, the positioning member 20 as shown in FIG. 12 was attached to the obtained main portion of the engaging member holding the upholstery material. The details of the positioning member 20 are described above. The inner diameter of the gripping portion was 5.5 mm and the length thereof was 24 mm. The outer diameter of the flexible rod core surrounded by the loop engaging elements was about 5.5 mm. The flexible rod core surrounded by the loop engaging elements was inserted into the hollow space of the gripping portion and the gripping halves 204a and 204b were snap-fitted, thereby attaching the positioning member 20 to the end of the engaging member.

Referring to FIG. 11, the positioning member 20 was attached such that the distance between the starting end Sl of the loop engaging elements 5 and the center of the projection 201 was 35 mm. Then the end of the positioning member 20 was inserted into the hole 24 which was formed on the bottom of curved groove in the cushion molding made of foamed urethane. Then, the starting end Sl was put precisely on the starting end Sf of the hook engaging elements 23. Thereafter, the engaging member was pushed into the groove successively to fix the upholstery material, thereby producing an automotive seat. Since the starting end Sf and the starting end Sl were precisely aligned in a line by using the positioning member, no defective due to the out of place between the starting ends found on the upholstery material and the operation of fixing the upholstery material was done smoothly.

Example 2

Production of Main Portion of Engaging Member Having Resin Layer

Using the same main portion of engaging member as used in Example 1, a discontinuous resin layer A was formed on the central portion of the surface (first main surface) opposite to the surface (second main surface) having the array of loop engaging elements along the lengthwise direction using a polyamide resin ("Micromelt 6211 manufactured by Henkel AG & Co.). The resin layer A had a width of 10 mm, a thickness of 120 μm and the coated portion/non-coated portion pitch was 10 mm/5 mm. Using the same polyamide resin, a continuous resin layer B (10 mm width and 150 μm thickness) was further formed on both the edge portions as shown in FIG. 4, thereby producing the main portion of engaging member. The deflection resistance of the obtained main portion of engaging member was 60 g for the portion having the resin layer and 18 g for the portion free from the resin layer.

The resin layers B on the edge portions were raised with the first main surface inside and opposed to each other as shown in FIG. 8, thereby forming the portion 17 for connecting the upholstery material. Two pieces of upholstery material (tubular knitted fabric of polyester fibers manufacture by Kuraray Co., Ltd.) were sewed at their edge portions onto the portion for connecting the upholstery material. As shown in FIGS. 14 and 15, a positioning member 30 was inserted into the lengthwise terminal end and fixed by sewing, thereby obtaining the main portion of engaging member attached with the positioning member 30 and the upholstery material C. The positioning member 30 was made of a low density polyethylene and had a flat portion with 1.0 mm thickness, a projection 301 with 5 mm outer diameter, and an expanded head with 6.5 mm outer diameter at its end. Referring to FIG. 15, the distance between the starting end Sl and the center of the projection 301 was 7.5 mm. Then the end of the positioning member 30 was inserted into the hole 24 which was formed on the bottom of curved groove in the cushion molding made of foamed urethane. Then, the starting end Sl was put precisely on the starting end Sf. Thereafter, the engaging member was pushed into the groove successively to fix the upholstery material, thereby producing an automotive seat. Since the starting end Sf and the starting end Sl were precisely aligned in a line by using the positioning member, no defective due to the out of place between the starting ends found on the upholstery material and the operation of fixing the upholstery material was done smoothly. In addition, the engaging member easily bent in conformity with the curved shape and was easily pushed into the groove without resistance, thereby obtaining a strong engagement between the loop engaging elements and the hook engaging elements. The obtained automotive seat was comfortable for sitting and the loosening and slipping out of place of the upholstery material were not found after sitting for a long time.

Comparative Example 1

The operation of fixing the upholstery material to the cushion molding was done in the same manner as in Example 1 except for omitting the use of the positioning member 20. Since the starting end Sf and the starting end Sl were not aligned into a line, the upholstery material was twisted to need the redoing of the fixing operation.

INDUSTRIAL APPLICABILITY

Since the engaging member of the invention is easily placed in a precise position in the groove of a cushion member, the engaging member is suitably used as a means for fixing an upholstery material (covering material) to a cushion molding (cushion member), for example, in the production of automotive seats, etc.

The method of producing an upholstered cushion molding of the invention is effectively used in the production of automotive seats, etc., because the upholstery material is attached in position to the cushion molding without slipping out of position and therefore the working efficiency is improved.

The upholstered cushion molding of the invention has good appearance free from the wrinkling and loosening of the upholstery material and therefore suitably used as automotive seats, etc.

What is claimed is:

1. An engaging member for fixing an upholstery material to a cushion molding, wherein:
   the engaging member is a strip of a base fabric having a first main surface and a second main surface opposite to the first main surface;
   the engaging member comprises a main portion having an array of loop engaging elements formed on a part of the second main surface along a lengthwise direction of the strip of the base fabric and regions for forming a connecting portion of the upholstery material at both lateral sides of the array of loop engaging elements along the lengthwise direction; and a positioning member having a projection at its end that is capable of being inserted into a hole formed on the cushion molding, the positioning member being formed outside, in a lengthwise direction, of an end of the array of loop engaging elements on at least one lengthwise terminal end of the main portion;
   the regions at both the lateral sides of the array of loop engaging elements are opposed to each other with the first main surface inside, thereby forming the connecting portion of the upholstery material and a tubular portion; and
   the positioning member is disposed such that a starting end of the array of loop engaging elements engages with a starting end of an array of hook engaging elements which is formed in a groove of the cushion molding.

2. The engaging member according to claim 1, wherein:
   a resin layer A and/or resin layers B is formed on the first main surface;
   the resin layer A is formed at a central portion discontinuously along the lengthwise direction of the strip of the base fabric;
   the resin layer B is formed at both lateral edge portions of the strip of the base fabric continuously or discontinuously along the lengthwise direction of the strip of the base fabric;
   a region having no resin layer is formed between the resin layer A and the resin layers B at the lateral edge portions; and
   the resin layers B at the lateral edge portions are opposed to each other with the first main surface inside to form the connecting portion of the upholstery material.

3. The engaging member according to claim 1, wherein a flexible rod core is inserted through the tubular portion and the positioning member having the projection which is fit into a hole formed on the cushion molding is attached to at least one terminal end of the flexible rod core.

4. The engaging member according to claim 1, wherein the projection of the positioning member has an expanded head.

* * * * *